3,052,610
CONCENTRATION OF ACETIC ACID
Michijiro Akaboshi, Toyonaka City, and Kikuji Uragami and Kensuke Okuma, Toyama City, Japan, assignors to Kurashiki Rayon Co., Ltd., Okayama Prefecture, Japan, a corporation of Japan
Filed May 19, 1960, Ser. No. 30,384
6 Claims. (Cl. 202—42)

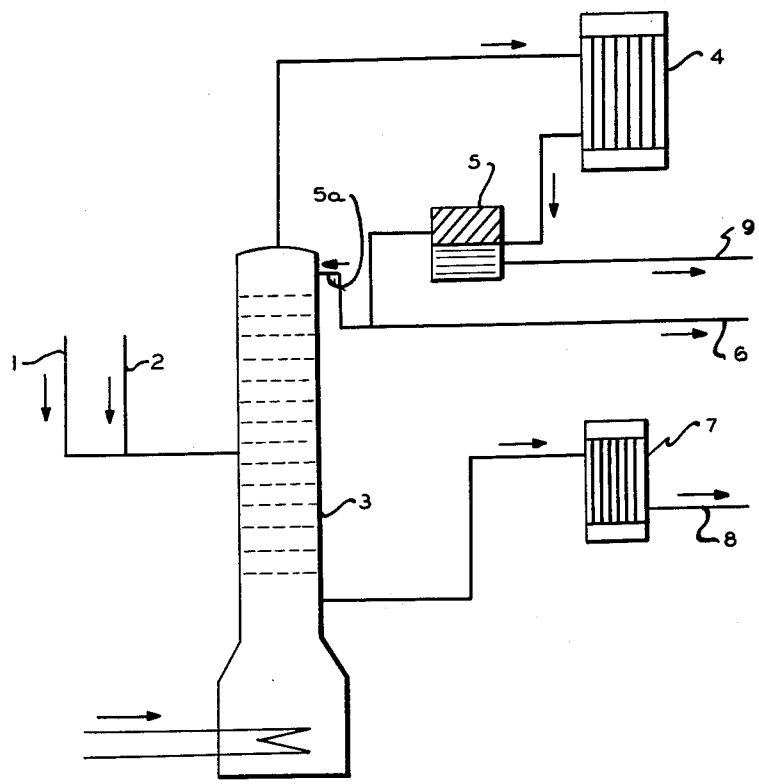

This invention relates to the concentration of aqueous solutions of acetic acid and is more particularly concerned with a process for concentrating aqueous acetic acid solutions which is effectively integrated with the manufacture of polyvinyl alcohol.

In accordance with conventional practice, polyvinyl alcohol is formed by the saponification or "alcoholysis" of polyvinyl acetate which, in turn, is formed by the polymerization of vinyl acetate. Vinyl acetate is conventionally produced by the action of acetylene upon acetic acid, as described, for example, in the article by L. Wilson Greene in "Chemical Engineering," July 1947, 98–99. In that process there is produced a mixture of vinyl acetate and acetic acid which is generally separated by distillation. Upon alcoholysis of polyvinyl acetate to produce polyvinyl alcohol, methyl acetate is produced as a by-product, and this compound is hydrolyzed to produce an aqueous mixture of methanol, acetic acid, and unreacted methyl acetate. The methanol and methyl acetate are readily separated from the mixture by distillation, and there is obtained from the bottom of the distillation column a stream of aqueous acetic acid. Aqueous acetic acid solutions are also produced in a number of other well-known chemical processes, e.g. the manufacture of rayon by the acetate process, or the treatment of pyroligneous liquor as described, for example, in Bright U.S. Patent 2,290,157.

The problem of concentrating or dehydrating such aqueous acetic acid solutions has been the subject of much research, and many proposals have been brought forth. Methods involving azeotropic distillation are described, for example, by D. F. Othmer (Ind. Eng. Chem., 27, p. 250, 1935). As azeotropic agents there have been proposed various alkyl acetates such as ethyl acetate, hydrocarbons such as benzene and petroleum ether, and alkyl chlorides such as carbon tetrachloride and ethylene chloride. However, these azeotropic agents have both advantages and disadvantages. For example, ethyl acetate has a high azeotropic capacity but its solubility in water is high and this solubility further increases substantially when the ethyl acetate contains even small amounts of impurities such as alcohols, ketones, and aldehydes. As a result, in most cases this azeotropic agent is used in combination with a hydrocarbon, as shown in H. M. Guinot Japanese Patent 151,490 (1942).

It is an object of the present invention to provide an improved process for the concentration or dehydration of aqueous solutions of acetic acid.

It is a further object of the invention to provide a process of the character indicated which is efficiently and effectively integrated with the production of polyvinyl alcohol.

In accordance with the invention, the aqueous acetic acid solution to be treated is distilled in the presence of vinyl acetate. The vinyl acetate and water form an azeotrope of lower boiling point than acetic acid, and this azeotrope is removed from the top of the distillation zone. At the same time, acetic acid accumulates and is removed from the bottom of the distillation zone. Upon condensation, the vinyl acetate-water azeotrope separates into an upper vinyl acetate phase substantially free of water and a lower water phase substantially free of vinyl acetate. Some of the vinyl acetate from the upper phase is returned to the top of the distillation zone as reflux, in accordance with conventional distillation technique, and the remainder is withdrawn as product.

Particularly suitable as a source of vinyl acetate for the distillation operation referred to above is the vinyl acetate-acetic acid mixture which is produced in the synthesis of vinyl acetate from acetylene and acetic acid. Prior to its use for the production of polyvinyl acetate by polymerization, the vinyl acetate must be separated from the acetic acid. In accordance with the invention, this operation is combined with the acetic acid dehydrating and concentrating operation so that two normally-independent processing steps are effectively and efficiently combined into a single operation which produces substantially pure vinyl acetate suitable for the production of polyvinyl acetate, and an effectively concentrated or dehydrated acetic acid suitable for use in the production of further quantities of vinyl acetate by reaction with acetylene.

While the aqueous acetic acid to be dehydrated may come from any source, such as the rayon-manufacturing and pyroligneous liquor processing operations referred to above, a particularly suitable source, which permits even further integration with the production of polyvinyl alcohol, is the aqueous acetic acid produced by the distillation of the aqueous acetic acid-methyl acetate-methyl alcohol mixture produced by the hydrolysis of methyl acetate obtained as a by-product in the alcoholysis of polyvinyl acetate to produce polyvinyl alcohol. The production of polyvinyl acetate and the subsequent alcoholysis of this polymer to produce polyvinyl alcohol and methyl acetate are well-known procedures and are described, for example in Cline et al. U.S. Patent 2,610,360. A particularly effective integrated process for the production of polyvinyl alcohol from polyvinyl acetate is disclosed in the co-pending application of Tsuguo Kominami, Serial No. 862,626, filed December 29, 1959.

It is a feature of the present invention that, except for the small amount of reflux, the vinyl acetate does not recycle through the system and is not repeatedly used, as is the azeotropic agent in the conventional azeotropic acetic acid-dehydrating operations, so that the fact that vinyl acetate is a polymerizable compound is not a problem and no difficulty from polymerization is experienced in practice.

It is a further feature of the invention that dehydration of acetic acid is effectively combined with the distillation of vinyl acetate-acetic acid mixtures produced in the synthesis of vinyl acetate and the single operation which replaces two operations makes possible concurrent economies in operating costs and in apparatus. Substantially the same apparatus normally used for the distillation of acetic acid-vinyl acetate mixtures alone can be suitably used.

Other objects and features of the invention will be readily apparent from the following detailed description of the invention and from the accompanying drawing wherein there is shown diagrammatically an apparatus system which can be suitably used for carrying out the process of the invention.

There is shown at 1 a supply of crude vinyl acetate solution obtained as product from the synthesis of vinyl acetate by the reaction between acetylene and acetic acid, and containing, for example, about 55% by weight of acetic acid. The introduction of the aqueous solution of acetic acid to be concentrated is shown at 2. This acetic acid solution may be derived from any source and is suitably obtained from the hydrolysis of methyl acetate obtained by the alcoholysis of polyvinyl acetate in the production of polyvinyl alcohol. The two solutions are mixed and introduced into distillation column 3 having, for example, 30 theoretical plates, and being heated by steam coils or other convenient means known in the art. In the distillation column, the water and vinyl acetate will vaporize as a low boiling azeotrope and the azeotrope vapors will move upwardly through the column and will be withdrawn at the top. These low-boiling vapors are condensed in a condenser 4 and the condensate passes to a separator 5 wherein phase separation takes place. The upper phase in the separator 5 is vinyl acetate and a portion of it is returned through line 5a to the column as reflux to provide a reflux ratio of, for example, 10 to 1. The remainder of the vinyl acetate in the separator 5 is removed as product through line 6. It may be further refined, if desired, by any convenient known procedure, before it is subsequently used, e.g. for the formation of polyvinyl acetate. The lower phase in the separator 5 is water containing a very small amount, e.g. 015 to 1.0 weight percent, of vinyl acetate. This lower phase is withdrawn from the separator through the line 9 and may be treated, if desired, to recover the small amount of vinyl acetate which it contains, by any known means. The concentrated acetic acid which accumulates at the bottom of the column is withdrawn through a line 8 and is cooled or condensed in a condenser 7 from which it is removed as product, for subsequent use, e.g. in the production of vinyl acetate.

Distillation is suitably carried out at atmospheric pressure, and the heat supplied and the quantity of feed to the distillation column are selected to maintain the distillation operation, in accordance with conventional practice. The distillation column may have any desired number of plates, depending upon the completeness of separation desired, but suitably the number of theoretical plates and the distillation conditions are selected to obtain the action of at least 15 actual plates.

Vinyl acetate-acetic acid mixtures of various proportions may be used and, similarly, acetic acid solutions of various water content may be employed, e.g. a 50% by weight aqueous acetic acid solution. The ratio between the aqueous acetic acid solution and the vinyl acetate-acetic acid mixture fed to the distillation column is selected to provide sufficient vinyl acetate to form an azeotrope with substantially all of the water present. Thus, the relative proportions of the mixture may be such that the ratio of vinyl acetate to water is 100 to 3.

While reference has been made to continuous operation, the distillation of the invention may be carried out batchwise, if desired, in which case the mixture to be distilled is charged to the still of the distillation column and distillation is continued until the water and vinyl acetate have been vaporized and collected as condensate, and concentrated acetic acid remains in the still, from which it is withdrawn as product.

It will be understood that, unless otherwise indicated, conventional operations and conventional apparatus are suitably employed in carrying out the process of this invention, including conventional distilling and condensing units. The conditions and relative relationships set forth above are those preferred in carrying out the process of the invention, but it will be understood that other conditions and relationships may be used within the scope of the invention.

It will also be understood that various changes and modifications may be made in the embodiments described above without departing from the scope of the invention as defined in the appended claims. It is intended, therefore, that all matter contained in the foregoing description and in the drawing shall be interpreted as illustrative only and not as limitative of the invention.

We claim:

1. A process of concentrating an aqueous solution of acetic acid which comprises mixing said solution with vinyl acetate and distilling the resultant mixture in a distillation zone, recovering vinyl acetate and water from the top of said zone, and recovering concentrated acetic acid from the bottom of said zone, separating said vinyl acetate from the water and withdrawing the vinyl acetate from the distillation system.

2. A process of concentrating an aqueous solution of acetic acid which comprises mixing said solution with a mixture of vinyl acetate and actic acid, distilling the combined mixture in a distillation zone, recovering vinyl acetate and water from the top of said zone, and recovering concentrated acetic acid from the bottom of said zone, separating said vinyl acetate from the water and withdrawing the vinyl acetate from the distillation system.

3. In the manufacture of polyvinyl acetate wherein acetylene and acetic acid are interacted to form a mixture of acetic acid and vinyl acetate and said vinyl acetate is polymerized to form said polyvinyl acetate, the steps of combining said mixture of vinyl acetate and acetic acid with an aqueous solution of acetic acid, distilling the combined mixture in a distillation zone, recovering the vinyl acetate and water from the top of said zone, and recovering concentrated acetic acid from the bottom of said zone.

4. In the manufacture of polyvinyl alcohol wherein acetylene and acetic acid are interacted to form a mixture of vinyl acetate and acetic acid, said vinyl acetate is polymerized to form polyvinyl acetate, said polyvinyl acetate is alcoholized to form polyvinyl alcohol and methyl acetate, and said methyl acetate is hydrolyzed to form a mixture from which aqueous acetic acid is separated, the steps of combining said mixture of vinyl acetate and acetic acid with said aqueous acetic acid, distilling the combined mixture in a distillation zone, recovering vinyl acetate and water from the top of said zone, and recovering concentrated acetic acid from the bottom of said zone.

5. In the manufacture of polyvinyl acetate wherein acetylene and acetic acid are interacted to form a mixture of acetic acid and vinyl acetate and said vinyl acetate is polymerized to form said polyvinyl acetate, the steps of combining said mixture of vinyl acetate and acetic acid with an aqueous solution of acetic acid, distilling the combined mixture in a distillation zone, recovering the vinyl acetate and water from the top of said zone, and recovering concentrated acetic acid from the bottom of said zone, separating the vinyl acetate from the water and returning the vinyl acetate for further polymerization to polyvinyl acetate and returning said concentrated acetic acid for further reaction with acetylene.

6. In the manufacture of polyvinyl alcohol wherein acetylene and acetic acid are interacted to form a mixture of vinyl acetate and acetic acid, said vinyl acetate is polymerized to form polyvinyl acetate, said polyvinyl acetate is alcoholized to form polyvinyl alcohol and methyl acetate, and said methyl acetate is hydrolyzed to form a mixture from which aqueous acetic acid is separated, the steps of combining said mixture of vinyl acetate and acetic acid with said aqueous acetic acid, distilling the combined mixture in a distillation zone, recovering vinyl acetate and water from the top of said zone, and recovering concentrated acetic acid from the bottom of said zone, separating the vinyl acetate from the water and returning the vinyl acetate for further polymerization to polyvinyl acetate and returning said concentrated acetic acid for further reaction with acetylene.

References Cited in the file of this patent

UNITED STATES PATENTS 2,333,756    Wentworth _____ Nov. 9, 1943